United States Patent [19]

Hunsperger et al.

[11] 4,439,004

[45] Mar. 27, 1984

[54] OPTICAL WAVEGUIDE AND MODULATOR AND PROCESS FOR FABRICATING SAME

[75] Inventors: Robert G. Hunsperger; Gordon A. Shifrin, both of Malibu, Calif.

[73] Assignee: Hughes Aircraft Company, El Segundo, Calif.

[21] Appl. No.: 437,079

[22] Filed: Oct. 27, 1982

Related U.S. Application Data

[60] Continuation of Ser. No. 778,288, Mar. 16, 1977, abandoned, which is a division of Ser. No. 345,625, Mar. 28, 1973, abandoned.

[51] Int. Cl.³ .................... G02B 5/172; G02F 1/015
[52] U.S. Cl. .................... 350/96.12; 252/62.3 GA; 350/96.14; 357/91
[58] Field of Search .................... 65/1, 2; 350/96.12

[56] References Cited

U.S. PATENT DOCUMENTS

| | | | |
|---|---|---|---|
| 3,387,163 | 6/1968 | Queisser | 313/499 |
| 3,395,366 | 7/1968 | Snitzer et al. | 350/96.3 X |
| 3,496,029 | 2/1970 | King et al. | 427/36 X |
| 3,542,536 | 11/1970 | Flam et al. | 350/96.12 X |

OTHER PUBLICATIONS

Garmire et al., Optical Waveguiding in Proton-Implanted GaAs in Applied Physics Letters, vol. 21, No. 3, Aug. 1, 1972, pp. 87-88.
Foyt et al., "Isolation of Junction Devices in GaAs Using Proton Bombardment", in Solid State Electronics, Pergamon Press, Gt. Britain, vol. 12, 1969, pp. 209-214.
Hall et al., Observation of Propagation Cutoff and its Control in Thin Optical Waveguides, in Applied Physics Letter, vol. 17, No. 3, Aug. 1, 1970, pp. 127-129.
Hunsperger et al., "Anneal Behavior of Defects in Ion Implanted Galium Arsenide Diodes", Metallurgical Transactions, vol. 1, Mar. 1970, pp. 603-607.
Shifrin et al., "Effect of Ion-Implantation Damage on the Optical Reflection Spectrum of Gallium Arsenide", Applied Physics Letters, vol. 17, No. 7, Oct. 1, 1970, pp. 274-276.

*Primary Examiner*—Richard D. Lovering
*Attorney, Agent, or Firm*—W. J. Bethurum; A. W. Karambelas

[57] ABSTRACT

Disclosed is an improved optical waveguide and modulator and an ion implantation process for fabricating same. The process includes the step of implanting high energy protons in a suitable semiconductive substrate material, such as gallium arsenide, to form a semi-insulating wave guiding layer therein for efficiently sustaining light propagation. The relatively large difference between the refractive indices of the high resistivity proton implanted layer and of the underlying low resistivity substrate result in highly efficient coupling and modulation of light passing through the proton implanted layer. The letter is partly the result of the relatively high resistivity attainable by proton implantation and partly the result of the sharp profile of ion dosage versus proton implantation distance into the substrate.

10 Claims, 4 Drawing Figures

4,439,004

OPTICAL WAVEGUIDE AND MODULATOR AND PROCESS FOR FABRICATING SAME

This application is a continuation of application Ser. No. 778,288, filed Mar. 16, 1977 and now abandoned, which in turn, is a division of Ser. No. 345,625, filed Mar. 28, 1973 and now abandoned.

FIELD OF THE INVENTION

This invention relates generally to thin film waveguides and fabrication processes therefor. More particularly, the invention is directed to an improved optical waveguide and modulator and an associated fabrication processes utilizing high energy ion implantation techniques.

BACKGROUND

Thin film optical waveguides for coupling light between two points are generally well-known in the art. Typical optical devices which make use of light transmission in thin films include light guides, light modulators, directional couplers, optical polarizers, and other similar devices. These devices usually include one or more thin films which are typically either dielectric or semi-insulating films which are deposited on a chosen substrate and have a film thickness on the order of the wavelength of light to be transmitted therethrough. Light introduced into one end of the film will be propagated to the other end of the film if the film material has a certain minimum absorption per unit length, which in the case of a semiconductor film implies a certain minimum bandgap energy. The coupling efficiency for this light propagation is dependent upon the amount of light that is reflected by the surface barriers on opposing sides of the film. This quantity is, of course, dependent upon the difference between the indices of refraction of the film material per se and of the material adjacent thereto, whether it be air or some adjacent integral material such as a semiconductive substrate. As this difference between adjacent indices of refraction increases, the coupling efficiency for light propagated through the film increases.

Gallium arsenide (GaAs) is a suitable semiconductive material from which these thin films can be fabricated, and GaAs has a bandgap energy suitable for sustaining light propagation at a relatively high efficiency. That is, the bandgap energy of gallium arsenide is approximately 1.4 electron volts (corresponding to an absorption edge of 8900 Å) which is somewhat greater than the photon energy, for example, from a helium-neon light source (1.075 eV) or from a Nd:YAG source (1.18 eV). Thus light from either of these two commonly used sources can be propagated in GaAs without excessive absorption. However, as will become apparent herein, the waveguide structures according to the present invention can also be fabricated from gallium phosphide, which has a bandgap energy of 2.24 eV. GaP allows high efficiency (low absorption) propagation of visible light with wavelengths as short as $\geq 5500$ Å (green). Additionally, aluminum arsenide (AlAs), which has a bandgap=2.4 eV and will transmit light of wavelengths $\geq 5200$ Å (blue-green), is also a suitable semiconductive material. The ternary compounds $Ga_{(1-x)}Al_xAs$ and $GaAs_xP_{(1-x)}$ can also be used and have absorption edge wavelengths intermediate to those for GaAs and GaP or GaAs and AlAs, depending on the molar fraction (x) of the third element.

PRIOR ART

One prior technique for providing thin semiconductive films for serving the above purpose involves epitaxially depositing a thin layer of high resistivity semiconductive material on a relatively low resistivity substrate in order to achieve the above described differences in adjacent refractive indices. The art of semiconductor epitaxy is quite advanced, and this process has been particularly desirable from the standpoint of providing thin uniform films whose precise thickness can be closely controlled by controlling the gas flow rates and temperatures of the epitaxial process.

A significant disadvantage, however, of the above described epitaxial process for forming optical waveguides is that, using standard state-of-the-art epitaxial deposition processes, it is difficult, if not impossible to achieve resistivities greater than about 1 ohm·centimeter in the waveguide epitaxial film. This limitation in the epitaxial deposition process thus restricts the magnitude of the index of refraction of the thin film epitaxial layer, which is, of course, dependent upon resistivity. Therefore, the difference in refractive indices at the thin epitaxial film-substrate interface will be dependent upon and limited by the disparity in resistivities which may be achieved using the epitaxial process.

THE INVENTION

The general purpose of the present invention is to provide a new and improved thin film optical waveguide and modulator and process for fabricating the same, which possesses all of the advantages of similarly employed epitaxial waveguides and processes, and yet overcomes the above limitation on epitaxial layer resistivities. To attain this purpose, we have constructed an optical waveguide wherein a selected region of a relatively low resistivity semiconductive substrate is implanted with protons to a closely controlled depth. Such implantation forms within the substrate a layer of relatively high resistivity material, which resistivity is substantially higher than any known epitaxial layer resistivities. The proton implanted region of the substrate may be closely controlled in both depth and uniformity. The relatively large amount of light reflection obtained at the interface boundary between the proton bombarded region and its underlying substrate is a result of both the difference in refractive indices of these two materials and the relatively abrupt proton implantation profile within the substrate. This profile of proton dosage versus distance into the substrate provides a good sharp variation in carrier concentration at the interface of the proton implanted layer and its underlying substrate, which improves the light guiding efficiency within the structure.

The above structure has a distinct utility as an optical waveguide per se, and advantageously the semiconductive substrate material used may be gallium arsenide, gallium phosphide, aluminum arsenide, or the other related ternary compounds identified above. As mentioned, these materials have desirable bandgap energies for sustaining light propagation from commercially available light sources. Additionally, the above waveguide structure may be further processed using state-of-the-art metallisation techniques to provide contacts to the opposing surfaces of the structure. This latter device may then be operated as a modulator for controlling the propagation of light through the proton implanted layer as a function of voltage applied to the opposing contacts.

Accordingly, an object of the present invention is to provide a new and improved ion implantation process for fabricating optical waveguides, modulators and other like optical components.

Another object is to provide a new and improved optical waveguide, or a modulator structure, each having improved light transmission characteristics.

A further object of the present invention is to provide a fabrication process of the type described in which the ion implantation film thicknesses may be closely controlled and which process may be rapidly carried out in comparison to slower and less controllable epitaxial deposition processes.

A feature of the present invention is the provision of a high energy proton implantation process for projecting high energy protons into suitable semiconductive substrates and at controlled depths to produce high quality light propagating films therein.

Another feature of this invention is the provision of optical waveguides and optoelectronic devices of the type described having light propagating films exhibiting a very high guiding and coupling efficiency.

A further feature of the present invention is the provision of thin film proton-implanted optical waveguides characterised by a very sharp change in carrier concentration at the film-substrate interface boundary.

These and other objects and features of the invention will become more fully apparent in the following description of the accompanying drawing.

BRIEF DESCRIPTON OF DRAWINGS

GENERAL PROCESS DESCRIPTION

Figure 1:
FIG. 1 illustrates, in diagrammatic cross-section view, the starting substrate material used in one process embodiment of the invention.

Referring now to FIG. 1, there is shown a substrate 10 of relatively low resistivity gallium arsenide, GaAs, on the order of $10^{-3}$ ohm-centimeters resistivity. The substrate 10 is initially cleaned and polished on the upper surface thereof using standard semiconductor processing techiques in preparation for the proton ion implantation process illustrated in FIG. 2. The substrate 10 is typically on the order of 8-10 mils in thickness.

Next, the GaAs substrate 10 is transferred to an ion implantation chamber (not shown) where it is mounted as the target for a high velocity beam 12 of protons which are energized to a high voltage, typically on the order of 300 KeV, to form a thin uniform proton bombarded layer 14 of the required thickness. The thickness of the layer 14 will be about 1 micron for every 100 KeV of proton energy, or about 3 microns for the exemplary embodiment shown in FIG. 2.

When the GaAs substrate 10 is bombarded by the proton beam 12, the carrier concentration in the region defined as the layer 14 is substantially decreased according to a new proton implantation carrier concentration profile. This process converts the upper surface layer 14 of the GaAs substrate 10 to a semi-insulating state having a typical resistivity on the order of $10^8$ ohm-centimeters. Such resistivity is about eight (8) orders of magnitude higher than the resistivity that can be achieved by depositing an epitaxial layer as mentioned in the above discussion of prior art. For this reason, the interface barrier or boundary 15 between the proton implanted region 14 and the underlying substrate region 10 is much superior in its optical characteristics to that of the boundary between an epitaxial layer and its corresponding underlying substrate. The edge of the semi-insulating layer 14 will be extremely sharp as a result of the fact that the carrier concentration in the proton implanted region 14 sharply decreases in the direction away from the interface boundary 15 and toward the bombarded surface of the region 14. This feature, coupled with the separate and distinct feature that the resistivity of proton implanted regions per se can be made much higher than that of epitaxial layers results in a greater light reflection at the interface boundary 15 than may be attained in epitaxial structures.

The resistivity of the proton-implanted layer 14 can, as mentioned, be made on the order of $10^8$ ohm-centimeters, and the latter will enable the respective indices of refraction of the substrate and implanted regions, respectively, to differ by an amount much greater than may be achieved in epitaxial structures. The thickness of the proton-implanted layer 14 can be easily controlled down to about 1 micron by the appropriate choice of proton implantation energies, and this thickness has been found to be extremely uniform over the entire surface area of the substrate 10, and substantially more uniform than the thickness of corresponding epitaxial layers. So that the latter feature also adds to the previously described improvements in the optical characteristics of the structure illustrated in cross-section in FIG. 2.

Proton implantation has been used previously in the construction of non-analogous and nonoptical devices, and for a further general discussion of proton implantation, reference may be made to a published article entitled, "Isolation of Junction Devices in Gallium Arsenide Using Proton Bombardment" by A. G. Foyt, et al., *SOLID STATE ELECTRONICS*, February 1969.

Figure 2:
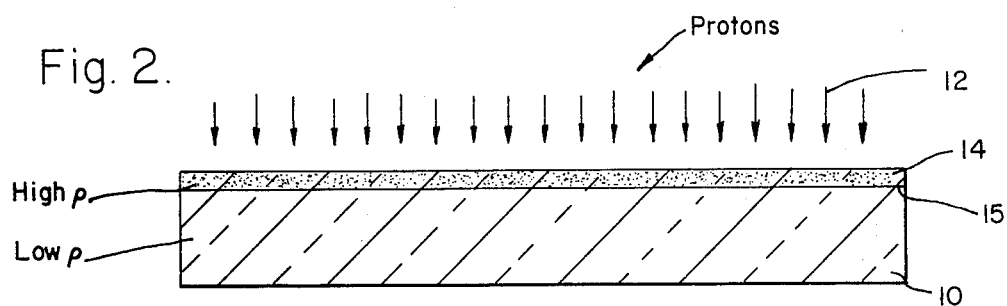
FIG. 2 illustrates the proton ion implantation into the substrate of FIG. 1 to form a thin film optical waveguide therein.

After the fabrication of the thin film optical waveguide structure of FIG. 2 is completed, thin layers 16 and 18 of metallization may be deposited upon the opposing surfaces of the structure using conventional metallization evaporation techniques. The contact at layer 18 is ohmic while that at layer 16 is a rectifying surface barrier. The exact procedures for forming the contacts 16 and 18 are given in the specific example given below. These contact layers 16 and 18 may be connected to external electrical terminals 20 and 22 for receiving a modulation voltage for modulating light waves 24 which are propagated through the film 14 as shown and exit therefrom as a modulated light wave 26. The electric field established between contact layers 16 and 18 by the application thereto of a modulating voltage will control the direction of polarization of the light passing through the thin film 14. This polarization modulation can be converted into amplitude modulation by subsequently passing the light beam 26 through a standard analyzing filter (not shown) which passes only light polarized in a given direction. This electro-optical effect is well-known in the art and it is described, for example, in D. Hall et al., *Optical Communication*, Vol.

1, No. 9, p. 403 (1970) and *Applied Physics Letters,* Vol. 17, No. 3, p. 127 (1970).

Figure 3:
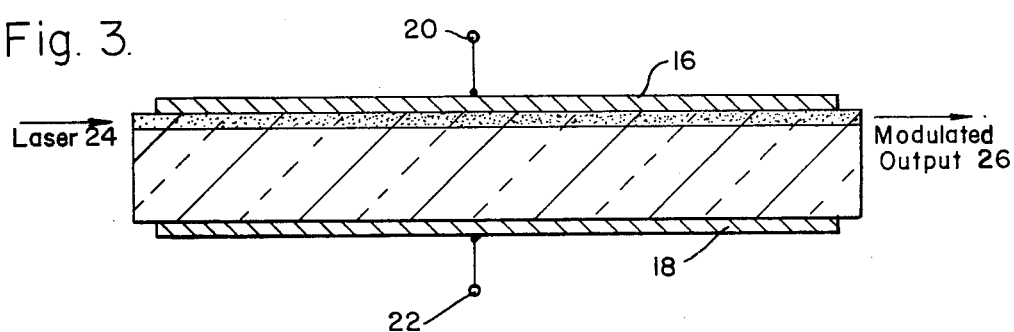
FIG. 3 illustrates the application of electrical contacts to the waveguide structure of FIG. 2.
Figure 4:
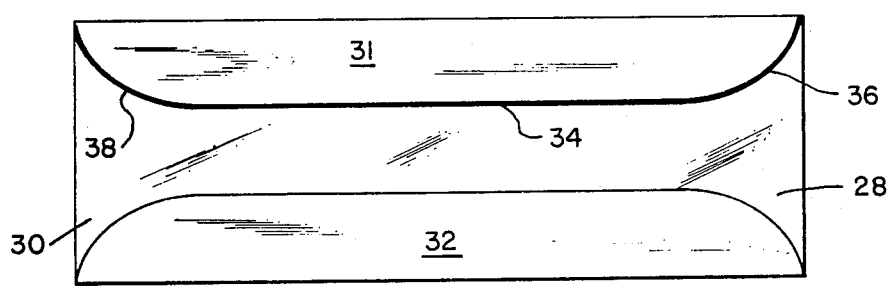
FIG. 4 illustrates a useful optical waveguide geometry for the structure shown in FIG. 3 and as determined by the proton resistant masking members shown.

For some electro-optical modulator applications, it will be preferred to form the proton-implanted region 14 with a plan view geometry for example such as that illustrated in FIG. 4, and this geometry includes bell-shaped regions 28 and 30 on the opposing ends of the substrate 10. This geometry may be provided by utilizing a proton resistant mask, such as a metal mask defined by the separate proton resistant regions 31 and 32. This mask may be deposited on the surface of the substrate 10 as shown in FIG. 4 prior to the above proton implantation step, and as a result, the proton-implanted region 14 will consist of an elongated central portion 34 which extends between the openings 36 and 38, the latter defining the geometry of the bell-shaped portions 28 and 30. Once the above geometry for the proton-implanted region 14 in FIG. 4 has been defined, the metal mask members 31 and 32 overlying substrate 10 may be removed from the surface of the substrate 10, whereupon the contacts 16 and 18 shown in FIG. 3 may be deposited on the opposing surfaces of the GaAs waveguide structure as previously described.

The geometry of the particular proton resistant mask is not limited to the two bell-shaped openings shown in FIG. 4, and it may be preferred to use only one bell-shaped opening 30 for good light collection efficiency and then tailor the other end of the light channel 14 to focus the light output through a smaller cross section area. However, various other geometries can be used for the mask members 30 and 31 in order to construct the light propagating channel in any geometry that is dictated by the particular optical requirements for the device fabricated.

The following is a description of two specific examples of two embodiments of the present process which we have actually reduced to practice.

EXAMPLE 1

An N type GaAs wafer 0.25 mm thick and $10^{-3}$ ohm·cm resistivity is polished on the upper surface thereof using conventional polishing techniques. The wafer is then placed in an ion implantation chamber and implanted with 300 KeV protons at room temperature and at an ion dosage of $1 \times 10^{15}$ ions per square centimeter. The wafer is then removed from the ion implantation chamber and transferred to an anneal furnace where it is heated in a hydrogen atmosphere at approximately 500° C. for 30 minutes to anneal out excess implantation-induced crystal damage, thereby reducing the optical absorption loss within the structure. It is possible to eliminate the latter anneal step by using a lower ion dose; but the exact dose has not yet been determined.

Next, the wafer is removed from the anneal furnace and transferred to a vacuum deposition chamber for the purpose of depositing an ohmic contact on the substrate; and standard contact metal alloys such as Au-Ge-Ni or Ag-In-Ge may be used for this contact. After completion of the latter step, the wafer is transferred back to the anneal furnace where it is heated in a hydrogen atmosphere to approximately 480° C. for 3 minutes (for a Au-Ge-Ni contact) or at 600° C. for 3 minutes (for a Ag-In-Ge contact). Then the wafer is again removed from the anneal furnace and transferred to a vacuum deposition system for the vacuum evaporation of an aluminum film on the proton bombarded surface to form a Schottky barrier type rectifying contact thereon.

Next, the wafer is diced into rectangular chips with dimensions 2 mm × 2 mm × 0.25 mm, whereafter each chip is die bonded on a suitable heat sink and then wire bonded for the above-described electrical connections using conventional die and wire bonding techniques, respectively.

EXAMPLE 2

The process in Example 1 above is repeated with the following modifications: Gallium phosphide, GaP, is used as the substrate material instead of GaAs, and the proton dosage is accordingly changed to $2 \times 10^{15}$ ions/cm$^2$. Additionally, the anneal temperature used in annealing out the ion implantation damage is raised from 500° C. to 550° C.

It should again be emphasized that the present invention is not limited to GaAs or GaP materials, and other suitable semiconductive materials such as those specified above may be used as the substrate starting material. Additionally, various ohmic and Schottky barrier contact metallization systems may be used instead of those specified in the above example, and various suitable light sources may be chosen consistent with the bandgap energy of the particular substrate material used.

What is claimed is:

1. An optical waveguide comprising:
    (a) a substrate of semiconductive material having a bandgap energy sufficiently high so that it will sustain the propagation of chosen light wavelengths at relatively high guiding efficiencies; and
    (b) a proton implanted region within said substrate and annealed to reduce and minimize optical absorption losses therein, said proton implanted region having a resistivity substantially higher than that of said substrate, and said proton implanted region and said underlying substrate material meeting at a common interface boundary adjacent a relatively sharp change in carrier concentration as a result of the high energy proton implantation dosage profile in said substrate, whereby said profile and the relatively large difference in refractive indices between said proton implanted region and said underlying substrate greatly enhance the reflectivity of light by said interface boundary and greatly enhance the light guiding efficiency in said proton implanted region.

2. The waveguide structure defined in claim 1 wherein said semiconductive material is selected from the group consisting of gallium arsendide, gallium arsenide phosphide, gallium phosphide, aluminum arsenide, and gallium aluminum arsenide.

3. The waveguide structure defined in claim 1 wherein said proton implanted region has a resistivity in excess of about $10^8$ ohm·centimeters.

4. The waveguide structure defined in claim 1 wherein the resistivity of said substrate is between about $10^{-3}$ and 1 ohm·centimeters and the resistivity of said proton implanted region is above about $10^8$ ohm·centimeters.

5. The waveguide structure defined in claim 1 which further includes electrical contacts adherent to opposing exterior surfaces of said proton implanted region and said substrate, respectively, for receiving a modulating voltage and controlling the optical modulation of light propagated through said proton implanted region.

6. The structure defined in claim 5 wherein the resistivity of said substrate is between about $10^{-3}$ and 1 ohm-centimeters and the resistivity of said proton implanted region is above about $10^8$ ohm-centimeters.

7. The structure defined in claim 6 wherein said proton implanted region has a bell-shaped geometry adjacent one edge of said substrate to facilitate the coupling of light into said proton implanted region.

8. The waveguide structure defined in claim 1 wherein said proton implanted region has a bell-shaped geometry adjacent one edge of the substrate, thereby facilitating the coupling of light into said proton implanted region.

9. An optical waveguide for efficiently sustaining light propagation of a chosen wavelength and fabricated by the process of:
  (a) providing a semiconductive substrate material selected from the group of materials consisting of gallium arsenide (GaAs), GaAs phosphide, gallium phosphide, aluminum arsenide and gallium aluminum arsenide, said substrate having an energy bandgap sufficiently high to efficiently sustain light propagation of a chosen wavelength;
  (b) implanting high energy protons to a controlled depth and dosage within said semiconductive substrate to thereby form a region of substantially higher resistivity than that of said substrate; and
  (c) annealing said semiconductive substrate for a predetermined temperature and time sufficient to anneal out excess implantation induced crystal damage, thereby reducing the optical absorption loss within said region of substantially higher resistivity, whereby substantial light reflection is achieved at the interface boundary between said semiconductive substrate and said proton implanted region.

10. A method for propagating light in thin layers of semiconductor material which comprises the steps of:
  (a) providing a substrate of light propagating material and having an energy bandgap sufficiently high to efficiently sustain light propagation of a chosen wavelength;
  (b) implanting high energy protons to a controlled depth and dosage within said substrate to thereby form a region of substantially higher resistivity than that of said substrate;
  (c) annealing said semiconductor substrate for a predetermined temperature and time sufficient to anneal out excess implantation induced crystal damage, thereby reducing the optical absorption loss within said region of substantially higher resistivity; and
  (d) introducing light of a chosen wavelength into a chosen location in said region of substantially higher resistivity, whereby substantial light reflection is achieved at the interface boundary between said semiconductor substrate and said proton implanted region.

* * * * *